US009384232B2

(12) United States Patent
Pittelko

(10) Patent No.: US 9,384,232 B2
(45) Date of Patent: *Jul. 5, 2016

(54) CONFIRMING DATA CONSISTENCY IN A DATA STORAGE ENVIRONMENT

(71) Applicant: Compellent Technologies, Eden Prairie, MN (US)

(72) Inventor: Michael H. Pittelko, Chaska, MN (US)

(73) Assignee: Dell International L.L.C., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/628,851

(22) Filed: Feb. 23, 2015

(65) Prior Publication Data

US 2015/0169671 A1 Jun. 18, 2015

Related U.S. Application Data

(63) Continuation of application No. 13/680,265, filed on Nov. 19, 2012, now Pat. No. 9,002,792.

(51) Int. Cl.
*G06F 17/30* (2006.01)
*G06F 11/14* (2006.01)
*H04L 29/08* (2006.01)

(52) U.S. Cl.
CPC ...... *G06F 17/30371* (2013.01); *G06F 11/1448* (2013.01); *G06F 17/30097* (2013.01); *G06F 17/30575* (2013.01); *H04L 67/10* (2013.01); *G06F 11/1451* (2013.01); *G06F 2201/82* (2013.01)

(58) Field of Classification Search
CPC ................................. G06F 17/30; G06F 17/00
See application file for complete search history.

(56) References Cited

U.S. PATENT DOCUMENTS

| | | | | |
|---|---|---|---|---|
| 6,332,163 B1* | 12/2001 | Bowman-Amuah | H04L 12/4604 | 709/217 |
| 6,529,909 B1* | 3/2003 | Bowman-Amuah | G06F 17/30569 | |
| 6,550,057 B1* | 4/2003 | Bowman-Amuah | .... G06F 17/30 | 700/80 |
| 6,606,660 B1* | 8/2003 | Bowman-Amuah | .. H04L 65/602 | 709/227 |
| 7,613,945 B2* | 11/2009 | Soran | .................... G06F 3/0608 | 714/5.11 |
| 8,024,306 B2* | 9/2011 | Palliyil | .............. G06F 17/30949 | 707/697 |
| 8,560,503 B1* | 10/2013 | McManis | ................ G06F 17/00 | 707/640 |

(Continued)

OTHER PUBLICATIONS

Smaldone, Stephen D. "Improving the performance, availability, and security of data access for opportunisitic mobile computing," PhD diss., Rutgers University—Graduate School—New Brunswick, 2011, pp. 1-163.

(Continued)

*Primary Examiner* — Farhan Syed
(74) *Attorney, Agent, or Firm* — Winthrop & Weinstine, P.A.

(57) ABSTRACT

A method for confirming replicated data at a data site, including utilizing a hash function, computing a first hash value based on first data at a first data site and utilizing the same hash function, computing a second hash value based on second data at a second data site, wherein the first data had previously been replicated from the first data site to the second data site as the second data. The method also includes comparing the first and second hash values to determine whether the second data is a valid replication of the first data. In additional embodiments, the first data may be modified based on seed data prior to computing the first hash value and the second data may be modified based on the same seed data prior to computing the second hash value. The process can be repeated to increase reliability of the results.

13 Claims, 6 Drawing Sheets

(56) References Cited

U.S. PATENT DOCUMENTS

| | | | | |
|---|---|---|---|---|
| 8,620,886 | B1* | 12/2013 | Madan | G06F 17/00 707/697 |
| 8,713,282 | B1* | 4/2014 | Rajimwale | G06F 3/0644 711/173 |
| 8,898,204 | B1* | 11/2014 | Sathe | G06F 17/30 707/812 |
| 9,002,792 | B2* | 4/2015 | Pittelko | G06F 11/1448 707/616 |
| 2002/0048369 | A1* | 4/2002 | Ginter | G06F 21/10 380/277 |
| 2002/0049788 | A1* | 4/2002 | Lipkin | G06F 17/30893 715/236 |
| 2002/0073080 | A1* | 6/2002 | Lipkin | G06F 17/30867 |
| 2002/0073236 | A1* | 6/2002 | Helgeson | G06F 17/30569 709/246 |
| 2003/0191719 | A1* | 10/2003 | Ginter | H04N 21/8358 705/54 |
| 2005/0234909 | A1* | 10/2005 | Bade | G06F 21/552 |
| 2006/0010227 | A1* | 1/2006 | Atluri | G06F 11/1453 709/217 |
| 2006/0288030 | A1* | 12/2006 | Lawrence | G09B 7/02 |
| 2007/0100793 | A1* | 5/2007 | Brown | G06F 17/30557 |
| 2007/0130231 | A1* | 6/2007 | Brown | G06F 11/3409 |
| 2007/0244920 | A1* | 10/2007 | Palliyil | G06F 17/30949 |
| 2007/0271570 | A1* | 11/2007 | Brown | G06F 9/5033 718/105 |
| 2007/0282951 | A1* | 12/2007 | Selimis | H04L 67/06 709/205 |
| 2009/0018996 | A1* | 1/2009 | Hunt | G06Q 30/02 |
| 2009/0019547 | A1* | 1/2009 | Palliyil | G06F 21/566 726/25 |
| 2010/0031000 | A1* | 2/2010 | Flynn | G06F 17/30949 711/216 |
| 2010/0169452 | A1* | 7/2010 | Atluri | H04L 12/413 709/215 |
| 2010/0332401 | A1* | 12/2010 | Prahlad | G06F 17/3002 705/80 |
| 2012/0136846 | A1* | 5/2012 | Song | H04L 45/7453 707/698 |
| 2012/0233251 | A1* | 9/2012 | Holt | H04L 67/06 709/204 |
| 2013/0060868 | A1* | 3/2013 | Davis | G06Q 50/01 709/206 |
| 2014/0108474 | A1* | 4/2014 | David | G06F 17/30 707/827 |
| 2014/0181041 | A1* | 6/2014 | Whitehead | G06F 11/1448 707/652 |
| 2014/0201126 | A1* | 7/2014 | Zadeh | G06K 9/627 706/52 |
| 2015/0222619 | A1* | 8/2015 | Hughes | H04L 63/08 713/168 |

OTHER PUBLICATIONS

Oppegaard, Martin Christoffer Aasen. "Evaluation of Performance and Space Utilisation When Using Snapshots in the ZFS and Hammer File Systems", Masters Thesis, Oslo University College, Spring 2009, pp. 1-208.

Junior, Correia, and Alfranio Tavares. "Practical database replication," Masters Thesis, University of Minho, 2010, pp. 1-126.

* cited by examiner

CONFIRMING DATA CONSISTENCY IN A DATA STORAGE ENVIRONMENT

CROSS-REFERENCE TO RELATED APPLICATIONS

This application is a continuation of U.S. patent application Ser. No. 13/680,265, titled "Confirming Data Consistency in a Data Storage Environment," filed Nov. 19, 2012, the disclosure of which is hereby incorporated by reference herein in its entirety.

FIELD OF THE INVENTION

The present disclosure generally relates to systems and methods for confirming data consistency in a data storage environment. Particularly, the present disclosure relates to systems and methods for efficiently confirming data consistency between two or more network connected data storage sites in a data storage subsystem or information handling system, without, for example, consuming too significant amount of network bandwidth between the data sites, and which may be particularly useful in systems with relatively slower network links or connections.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Likewise, individuals and businesses seek additional ways to protect or secure information, so as to improve, for example, reliability, fault tolerance, or accessibility of that information. One such method of protecting information in an information handling system involves replicating or sharing information so as to ensure consistency between redundant resources, such as data storage devices, including but not limited to, disk drives, solid state drives, tape drives, etc. Replication of information, or data, is possible across various components communicatively coupled through a computer network, so the data storage devices may be, and often desirably are, located in physically distant locations. One purpose of data replication, particularly remote data replication, is to prevent damage from failures or disasters that may occur in one location, and/or in case such events do occur, improve the ability to recover the data.

During conventional replication processes, when data gets transmitted from an originating or source site to a destination site, the data is typically, and should be, confirmed as received. Furthermore, during transmission, such data is also often confirmed as accurate, so as to verify the data had been transmitted and received successfully. In this regard, various checks may be used to confirm successful transmission of the data, including for example, cyclic redundancy checks (CRCs), which are specifically designed to protect against common types of errors during communication, and can provide quick and reasonable assurance of the integrity of any messages transmitted.

After transmission, however, the data at one of the locations may become invalid (e.g., incorrect) over time for any number of explainable or unexplainable reasons. One manner by which it can be confirmed that data from a first site is consistent with data at a second site is to resend the data from one of the sites to the other and verify the data matches that stored in the other site or simply rewrite the data at the other site. However, this can obviously put a significant strain on the available network bandwidth between the two sites, which may otherwise be used for other communication between the sites, such as initial replication. The demand on bandwidth may be further compounded where there are numerous data storage sites scattered over various remote locations, each attempting to confirm validity of its data.

Accordingly, what is needed are better systems and methods for confirming data consistency in a data storage environment that overcome the disadvantages of conventional methods for data confirmation. Particularly, what is needed are systems and methods for efficiently confirming data consistency between two or more network connected data storage sites in a data storage subsystem or information handling system, without, for example, consuming too significant amount of network bandwidth between the data sites, which may otherwise desirably be reserved for other communication between the systems. Such systems and methods could be particularly useful with, but are not limited to use in, systems with relatively slower network links or connections.

BRIEF SUMMARY OF THE INVENTION

The present disclosure, in one embodiment, relates to a method for confirming the validity of replicated data at a data storage site. The method includes utilizing a hash function, computing a first hash value based on first data at a first data storage site and utilizing the same hash function, computing a second hash value based on second data at a second data storage site, wherein the first data had previously been replicated from the first data storage site to the second data storage site as the second data. The method also includes comparing the first and second hash values to determine whether the second data is a valid replication of the first data. Typically, the first and second data storage sites are remotely connected by a network. As such, the method may include transmitting either the first or second hash values via the network for comparing with the other hash value. Likewise, the hash function may also be transmitted via the network from either the first or second data storage site to the other storage site, which can help ensure the same hash function is used be each. In other embodiments, a data structure, such as a table, may be provided for storing a plurality of hash functions, each being available for use by the first and second data storage sites. In this regard, the method may further include selecting the hash function for use from the table for utilization in computing the first and second hash values. In additional or alternative embodiments, the first data may be modified based on seed data prior to computing the first hash value and the second data may be modified based on the same seed data prior to computing the second hash value. The seed data may also be transmitted via the network from either the first or second data storage site to the other, which can help ensure the same seed data is used be each. In some embodiments, the process can be repeated any suitable number of times, each time utilizing a different hash function than in a previous time. Doing so can increase the reliability of the confirmation results. The process can be repeated according to any manner; however, in one embodiment, the process is repeated according to a predetermined periodic cycle.

The present disclosure, in another embodiment, relates to an information handling system. The system includes a first data storage site configured to compute a first hash value based on first data stored at the first data storage site, utilizing a hash function. Likewise, the system includes a second data storage site, having data replicated from the first data storage site, and similarly configured to compute a second hash value based on second data stored at the second data storage site, utilizing the same hash function. Either or both of the first data storage site and second data storage site may be configured to transmit its computed hash value via a computer network to the other site for comparison of the first hash value with the second hash value so as to determine whether the second data is a valid replication of the first data. Typically, the first data storage site and the second data storage site are remote from one another. A mismatch during the comparison of the first and second hash values generally indicates that either the first or second data storage site or both includes invalid data. In additional embodiments, the first data storage site may be configured to modify the first data based on seed data prior to computing the first hash value, and the second data storage site may be configured to modify the second data based on the same seed data prior to computing the second hash value.

The present disclosure, in yet another embodiment, relates to a method for confirming the validity of replicated data at a data storage site. The method includes utilizing a hash function, computing a first hash value based on a selected portion of first data at a first data storage site and utilizing the same hash function, computing a second hash value based on a selected portion of second data at a second data storage site, wherein the first data had previously been replicated from the first data storage site to the second data storage site as the second data. The selected portion of replicated second data corresponds to the selected portion of first data. Upon computation of the hash values, the first and second hash values may be compared so as to determine whether the selected portion of second data is a valid replication of the selected portion of first data. These steps may be repeated any suitable number of times, each time utilizing a different selected portion of the first data and corresponding selected portion of the second data than in a previous time. The results of such a repeated process are substantially representative of whether the entire second data is a valid replication of the entire first data. For example, each subsequent repetition in contiguous chain of repetitions resulting in a match of the first and second hash values increases the likelihood that the second data is indeed a valid replication of the first data. The process can be repeated according to any manner; however, in one embodiment, the process is repeated according to a predetermined periodic cycle.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

Figure 1:
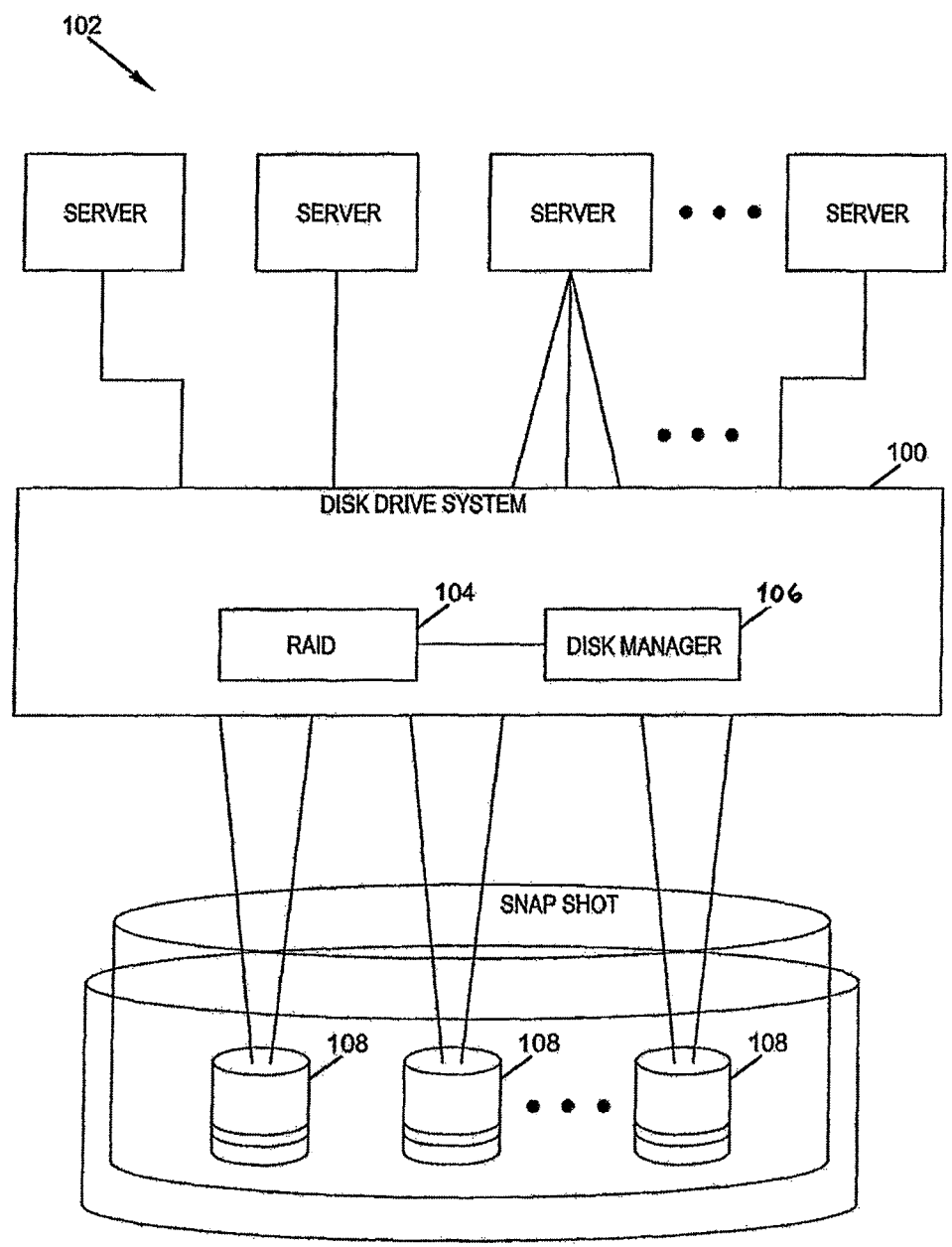
FIG. 1 is a schematic of a disk drive system suitable with the various embodiments of the present disclosure.

The present disclosure relates to novel and advantageous systems and methods for confirming data consistency in a data storage environment. Particularly, the present disclosure relates to novel and advantageous systems and methods for efficiently confirming data consistency between two or more network connected data storage sites in a data storage subsystem or information handling system, without, for example, consuming too significant amount of network bandwidth between the data sites, and which may be particularly useful in systems with relatively slower network links or connections or in systems where there is a significant amount of other communication which should have priority to the available bandwidth.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch-screen and/or a video display. The information handling system may also include one or more buses operable to transmit communications between the various hardware components.

While the various embodiments are not limited to any particular type of information handling system, the systems and methods of the present disclosure may be particularly useful in the context of a disk drive system, or virtual disk drive system, such as that described in U.S. Pat. No. 7,613,945, titled "Virtual Disk Drive System and Method," issued Nov. 3, 2009, the entirety of which is hereby incorporated herein by reference. Such disk drive systems allow the efficient storage of data by dynamically allocating user data across a page pool of storage, or a matrix of disk storage blocks, and a plurality of disk drives based on, for example, RAID-to-disk mapping. In general, dynamic allocation presents a virtual disk device or volume to user servers. To the server, the volume acts the same as conventional storage, such as a disk drive, yet provides a storage abstraction of multiple storage devices, such as RAID devices, to create a dynamically sizable storage device. Data progression may be utilized in such disk drive systems to move data gradually to storage space of appropriate overall cost for the data, depending on, for example but not limited to, the data type or access patterns for the data. In general, data progression may determine the cost of storage in the disk drive system considering, for example, the monetary cost of the physical storage devices, the efficiency of the physical storage devices, and/or the RAID level of logical storage devices. Based on these determinations, data progression may move data accordingly such that data is stored on the most appropriate cost storage available. In addition, such disk drive systems may protect data from, for example, system failures or virus attacks by automatically generating and storing snapshots or point-in-time copies of the system or matrix of disk storage blocks at, for example, predetermined time intervals, user configured dynamic time stamps, such as, every few minutes or hours, etc., or at times directed by the server. These time-stamped snapshots permit the recovery of data from a previous point in time prior to the system failure, thereby restoring the system as it existed at that time. These snapshots or point-in-time copies may also be used by the system or system users for other purposes, such as but not limited to, testing, while the main storage can remain operational. Generally, using snapshot capabilities, a user may view the state of a storage system as it existed in a prior point in time.

FIG. 1 illustrates one embodiment of a disk drive or data storage system 100 in an information handling system environment 102, such as that disclosed in U.S. Pat. No. 7,613,945, and suitable with the various embodiments of the present disclosure. As shown in FIG. 1, the disk drive system 100 may include a data storage subsystem 104, which may include, but is not limited to, a RAID subsystem, as will be appreciated by those skilled in the art, and a disk manager 106 having at least one disk storage system controller. The data storage subsystem 104 and disk manager 106 can dynamically allocate data across disk space of a plurality of disk drives or other suitable storage devices 108, such as but not limited to optical drives, solid state drives, tape drives, etc., based on, for example, RAID-to-disk mapping or other storage mapping technique. The data storage subsystem 104 may include data storage devices distributed across one or more data sites at one or more physical locations, which may be network connected. Any of the data sites may include original and/or replicated data (e.g., data replicated from any of the other data sites) and data may be exchanged between the data sites as desired.

As described above, individuals and businesses seek ways to protect or secure information, so as to improve, for example, reliability, fault tolerance, or accessibility of that information. One such method of protecting information in an information handling system involves replicating or sharing information so as to ensure consistency between redundant resources, such as data storage devices, including but not limited to, disk drives, solid state drives, optical drives, tape drives, etc. During conventional replication processes, when data gets transmitted from an originating site to a destination site, the data is typically, and should be, confirmed as successfully received, often involving a check, such as CRC, which is specifically designed to protect against common types of errors during communication. As discussed above, however, over periods of time following transmission, the data at one of the locations may become invalid. While one method of confirming that data from a first site is consistent with data at a second site is to resend the data from one site to the other, such method can put a significant strain on the available network bandwidth between the two sites. This demand on bandwidth may be further compounded where there are numerous data storage sites scattered over various remote locations, each attempting to confirm validity of its data.

The present disclosure improves data confirmation/validation processes for data stored in a data storage system or other information handling system, such as but not limited to the type of data storage system described in U.S. Pat. No. 7,613,945. The disclosed improvements can provide more cost effective and/or more efficient data confirmation/validation processes, particularly in systems with relatively slower network links or connections or in systems where there is a significant amount of other communication which should have priority to the available bandwidth.

In general, in one embodiment of the present disclosure, at any given point in time subsequent initial transmission of the replicated data, in order to confirm data consistency between two data sites, such as but not limited to, an originating or source site and a replication site, the to-be-confirmed data at each site may be hashed using the same hash function or algorithm and the hash values may then be compared to determine whether they are equal. If they are equal, that is, the to-be-confirmed data at each site hashed to the same hash value, it is likely that the underlying data, to which the hash values correspond, is also the same and therefore valid at both sites. Such method for confirming data consistency between two data sites can be performed across a network using as little bandwidth as that required to send the computed hashed values from one site to the other, thereby significantly reducing the amount of bandwidth used as compared to that conventionally used for confirming data consistency between two sites by resending all the data.

Figure 2:
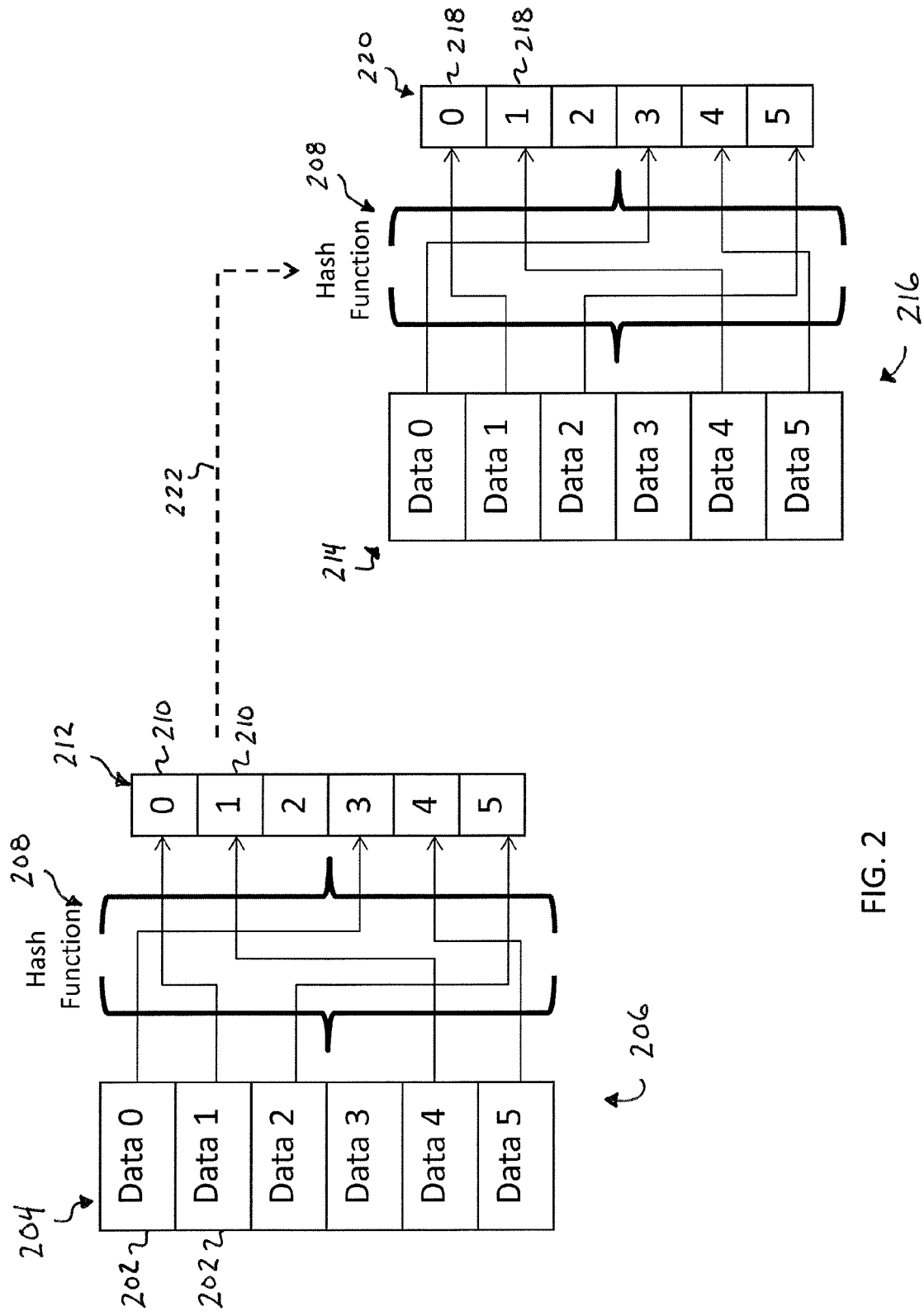
FIG. 2 is a concept drawing of a method for confirming data consistency in a data storage environment in accordance with one embodiment of the present disclosure.

More specifically, in one embodiment illustrated in FIG. 2, an initial step may include hashing data 202, or a set of data 204, at a first one of the data sites 206, such as but not limited to, an originating or source site, utilizing a specified or predetermined hash function 208 or algorithm so as to obtain a hash value 210 or set of hash values 212 for the data or set of data, respectively. Data, as used herein, in addition to its ordinary meaning, is meant to include any logical data unit or portion of a logical data unit, including but not limited to data blocks, data pages, volumes or virtual volumes, disk extents, disk drives, disk sectors, or any other organized data unit, or portions thereof. A data set, as used herein, is meant to include a plurality of data. Utilizing the same hash function 208, replication data 214 at a second one of the data sites 216, such as but not limited to, a replication site, corresponding to the data 202 or a set of data 204 at the first data site may similarly be hashed so as to obtain a hash value 218 or set of hash values 220 for the replication data. The hash value(s) 210, 212 from the first data site 206 may be transmitted 222, such as via a network, including but not limited to, a LAN, WAN, or the Internet, to the second data site 216 at any time, such as but not limited to, any time after initial replication, for comparison with the hash value(s) 218, 220 at the second data site, or vice versa, so that the hash values can be compared. If the hash value(s) from each site are equal, it is likely that the underlying data 202, 204 at data site 206 and the underlying data 214 at data site 216 are also the same and therefore valid at both sites. The hash values generally consume significantly less space than the underlying data, and therefore, when sent across a network, would consume significantly less bandwidth. This contrasts with the conventional methods of confirming data consistency between sites by resending all the data from one site to the other, as discussed above, which can put a significant strain on the available network bandwidth between the two sites.

In other embodiments, the hash value(s) from one site need not necessarily be sent to the other, but instead, the hash value(s) from each of the sites could be sent to a third site for comparison. However, such embodiments would require two separate transmissions of the hash value(s) as opposed to a single transmission of the hash value(s) from one site to the other. Nonetheless, in some embodiments, it may be beneficial for the comparison to be performed at a third site.

In one embodiment, in order to ensure the same hash function is utilized by both sites, the hash function, or an identification of the hash function, used may be transmitted from one of the sites to the other. In particular embodiments, the hash function, or an identification of the hash function, used may be transmitted from the first data site 206, for example, prior to computation of the hash values or at generally the same time as, and along with, the computed hash value(s) 210, 212. In such embodiments, any number of hash functions may be provided and available for selected use at any given time; all that may be necessary is for both sites to have knowledge of, and use, the same hash function.

In other embodiments, a single hash function may be provided by the system and be stored at, or be accessible to, each data site. Thus, every data site will always have access to the same hash function as used by the others, and needs no further information from the other sites or elsewhere in order to identify the hash function required. In such embodiments, no transmission of the hash function between data sites would be necessary. Of course, the single hash function could be replaced periodically or on some other replacement basis, to help ensure data reliability and security. In still other example embodiments, there may be multiple hash functions provided and stored in, for example, a hash table that is directly or indirectly accessible to each of the data sites at any given time. Although a table is described, it is recognized that the term table is conceptual and any data structure is suitable. At any given time, which hash function is selected from the table and used may be based on any algorithm. For example, but not limited by, the hash function used at any given time may be based on the actual or system time at which data confirmation between two sites is performed, and may alternate between available hash functions as time passes. While specific examples have been provided herein, the present disclosure is not limited by such examples, and any method, now known or later developed, for ensuring that a particular hash function is utilized by each data site during data confirmation may be used and is within the scope of the present disclosure.

A hash function is generally any algorithm or subroutine that maps data, or a data set, often of large and variable lengths, to smaller data sets of a fixed length. For example only, and certainly not limited to, names of varying lengths for a plurality of people could each be hashed to a single integer. The values returned by a hash function are often referred to as hash values, hash codes, hash sums, checksums, or simply hashes. A hash function is deterministic, meaning that for a given input value, it consistently generates the same hash value.

Despite the deterministic nature of a hash function with respect to a given input, however, a hash function may map several different inputs to the same hash value, causing what is typically referred to as a "collision." For example only, again using names as inputs, both "John Smith" and "Bob Smyth" may hash to the same hash value, depending on the hash algorithm used. Unfortunately, due to the very nature of hash functions, which map relatively larger data sets to relatively smaller data sets, even under the best of circumstances, collisions are mathematically unavoidable.

Figure 3:
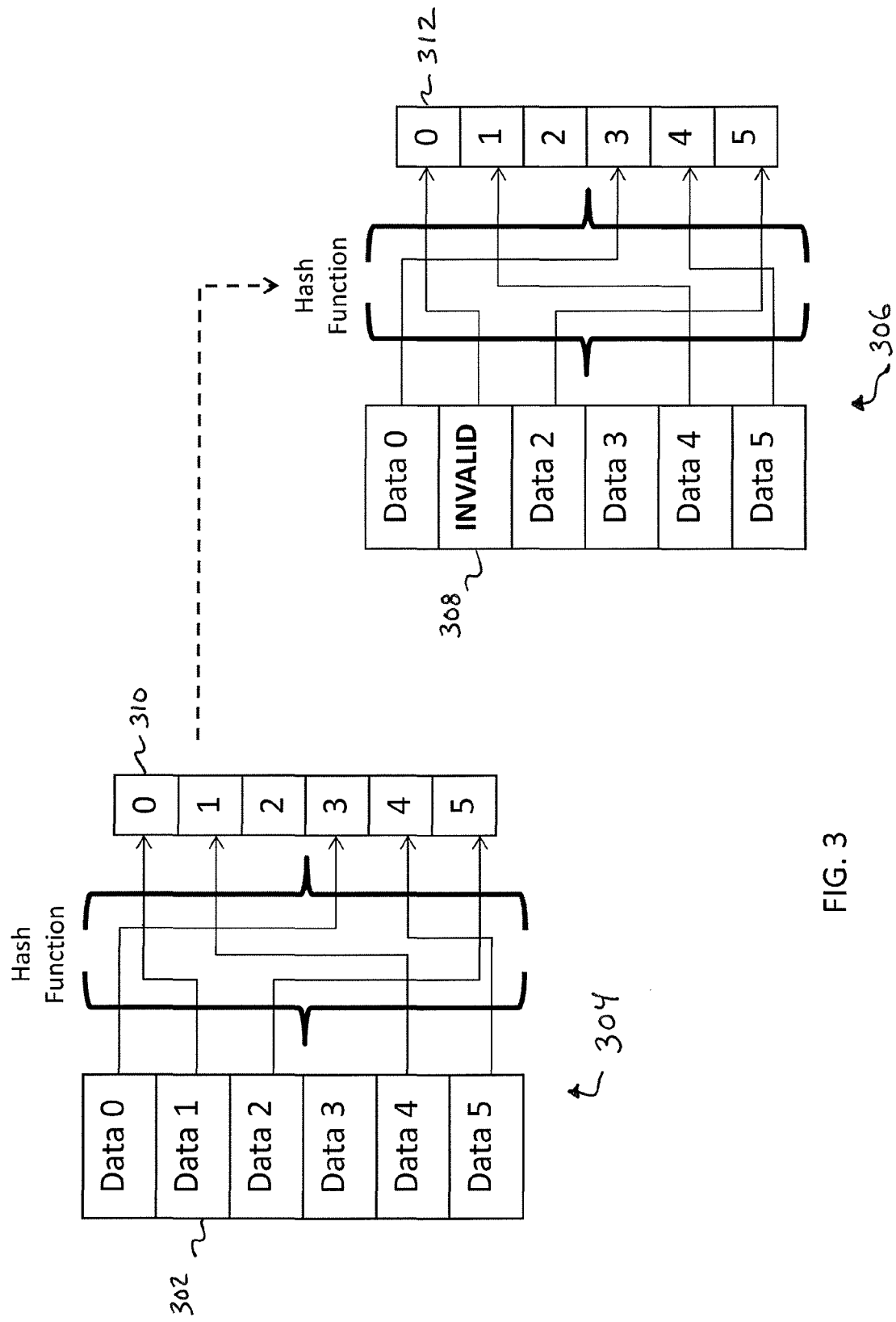
FIG. 3 is a concept drawing of a method for confirming data consistency in a data storage environment illustrating a collision.

Accordingly, in the various embodiments described herein, while it is likely that the underlying data at two sites are equal when the hash values computed for the data at each site are equal, it is not a sure-fire guarantee that the underlying data at the data sites is indeed the same. For a simple example, as illustrated in FIG. 3, valid Data 1 302 at data site 304 was previously transmitted for replication at data site 306. However, at some point after being sent by data site 304 for replication at data site 306, either during transmission or sometime after, the corresponding replicated data 308 had been rendered invalid without knowledge to either data site. During a subsequent data confirmation process to confirm validity of the data, in accordance with the various embodiments of the present disclosure previously discussed, which utilize and transmit hash values rather than full data sets, Data 1 302 at data site 304 may hash to a hash value of "0" 310. While typically uncommon with small data sets, although increasingly less uncommon with relatively larger amounts of data or larger data sets, at replication data site 306, the corresponding replicated data 308, which has been rendered invalid, may similarly produce the same hash value of "0" 312 under the same hash function, despite the fact that the replicated data 308 and the original Data 1 302 are not indeed equal. When this type of collision occurs, the system may not recognize that the data at one of the sites is invalid, and would not likely take steps to rebuild the data. Thus, this type of collision may result in what is referred to herein as an "undetected error" in the corresponding data between the data sites, in that the error would continue to go undetected despite continuing efforts under such data confirmation processes. Notwithstanding the potential for undetected errors, for some applications, such as but not limited to, those applications with small amounts of data or where the data being replicated is substantially or relatively unimportant, when the hash values from each data site are equal, it can be very likely that the underlying data at the data sites is also the same. In most cases, depending at least partly on the type of logical data unit hashed and the hash function used, the probability of getting a collision and an undetected error may be so small that the reduction in bandwidth usage outweighs the risk of getting such a collision.

However, in applications with, or in data storage systems having, relatively large amounts of data or relatively large data sets, the value of results obtained simply by hashing the data at two sites and comparing the hashed values may decrease significantly. The value of the above-discussed methods of data confirmation may decrease because, as the data size increases, the amount of data hashing to the same hash value increases, thereby increasing collisions. As collisions increase, the risk of undetected errors can also increase.

In view of the foregoing, the above-discussed methods for confirming data consistency may include additional steps or techniques to increase the reliability of the data confirmation results and reduce the probability that a collision resulting in an undetected error will occur. While various embodiments of the present disclosure will be described in more detail below, generally, additional embodiments may utilize hash seeds and/or hash functions with cryptographic properties, thereby exhibiting good avalanche effects, or in some cases, relatively high avalanche effects. In addition, the same to-be-confirmed data may be repeatedly hashed and verified over time, with each repetition including a change in one or more of: the hash function used, the hash seed used, or the starting and/or endpoint of the data hashed within the to-be confirmed data. With each subsequent pass of the data confirmation process, including at least one change, a positive comparison of the hash values increases the confidence that the underlying data is, in fact, identical. For example, a positive match of hash values in a first pass will give some indication that the underlying data is likely the same. A positive match of hash values in a second pass, where the second pass includes at least one change as described above, will increase the confidence that the underlying data is the same. A positive match of hash values in a third or more pass, where each subsequent pass includes at least one change as described above, will further increase the confidence that the underlying data is the same. In general, the more passes completed and resulting in a positive match of hash values, the more likely the underlying data is, in fact, the same.

More specifically, in one additional embodiment, to increase the reliability of the data confirmation results and reduce the probability of a collision resulting in an undetected error, the original data may be altered in a predetermined manner by adding a hash "seed" to the data at each site prior to, and for the purposes of, hashing the corresponding data at each site into respective hash values. The hash seed may be prepended to the data, appended to the data, or may be otherwise inserted at any suitable location within the data, and generally, may be combined or associated with the original data, or set of data, so as to alter the original data in a predetermined manner. More particularly, a hash seed may be any predetermined data of any size, such as but not including, an integer, a word, or a bit, byte or any other sized chunk of organized data having a predetermined value. However, typically the hash seed value would be very small, so that the hash seed conforms with the effort to reduce bandwidth usage between the data sites for data confirmation processes. In alternative embodiments, a hash seed could be a modifying algorithm or function that takes the original data as input and outputs modified data, which is modified according to a predefined deterministic algorithm.

As indicated above, additional embodiments may utilize hash functions with cryptographic properties, which typically exhibit good avalanche effects, or in some cases, relatively high avalanche effects. When relatively high avalanche effects are present in a hash function, whenever the input is changed, even ever so slightly (for example, by changing a single bit), the output changes significantly or even drastically. In this regard, providing a hash seed to alter the data in a predetermined manner can cause significant changes in the computed hash values, thereby reducing the risk that a collision will occur where the underlying data is not, in fact, equivalent at both data sites.

A process for confirming the data between two data sites utilizing a hash seed is generally carried out in much the same manner as described above with respect to FIG. 1, with the additional step(s) of adding, combining, or otherwise associating a hash seed to the data, or a sets of data, at each data site in order to alter the data in a predetermined manner prior to hashing the data to their respective hash values. The hash seed may be randomly generated, or may be generated according to any suitable algorithm. Similar to the manners described above for ensuring that the same hash function is used at each data site, in one embodiment, in order to also ensure the same hash seed is utilized by each data site, the hash seed, or an identification of the hash seed, used may be transmitted from one data site to the other. In further embodiments, the hash seed or an identification of the hash seed may be transmitted from a first data site to a second data site, for example, prior to computation of the hash values or at generally the same time as, and along with, the hash function used by, and the computed hash value(s) obtained at, the first data site. In such embodiments, any number of hash seeds may be provided and available for selected use at any time; all that may be necessary is for both sites to have knowledge of, and use, the same hash seed. Indeed, as discussed above, a hash seed could be randomly generated, as long as the same randomly generated hash seed is utilized at each data site during the data confirmation process. Also like the hash function, in other embodiments, a single hash seed may be provided by the system and be stored at, or accessible to, each data site. Thus, every data site will always have access to the same hash seed used by the others, and needs no further information from the other sites or elsewhere in order to identify the hash seed required. In such embodiments, no transmission of the hash seed between data sites would be necessary. Of course, the single hash seed could be replaced periodically or on some other replacement basis, to help ensure data reliability and security. In still other example embodiments, multiple hash seeds may be provided in, for example, a hash seed table that is directly or indirectly accessible to each of the data sites at any given time. At any given time, which hash seed is selected from the table and used may be based on any algorithm. For example, but not limited by, the hash seed used at any given time may be based on the actual or system time at which data confirmation between two sites is performed, and may alternate between available hash seeds as time passes. While specific examples have been provided herein, the present disclosure is not limited by such examples, and any method, now known or later developed, for ensuring that a particular hash seed is utilized by each data site during data confirmation may be used and is within the scope of the present disclosure.

Altering the original data in a predetermined manner prior to hashing by utilizing a hash seed, as described above, can reduce the likelihood of a collision resulting in an undetected error. Additionally utilizing a hash function with good avalanche effect can further reduce the likelihood of a collision resulting in an undetected error. Specifically, if a comparison of the hash values between the data sites, now based on seeded data and a hash function with good avalanche effect, indicates that the hash values from each site are equal, then there is generally a very strong likelihood that the underlying data at each data site is also the same and thus valid at both sites.

With reference again to FIG. 3, for example, presume that both Data 1 302 at data site 304 and the purported corresponding invalid data 308 at replication data site 306 were each prepended, or otherwise combined, with a hash seed, the hash seed being the same for each. Of course, likely depending partly on the complexity of the hash seed selected and the avalanche effect of the hash function utilized, in general, it is very unlikely that the Data 1 302 and the invalid data 308 would still hash to the same hash value. Thus, utilizing a hash seed can further increase the reliability of the various data confirmation processes described herein. Similarly, despite an additional transmission of a hash seed, transmitting the hash seed, hash function, and computed hash values between the data sites still generally consumes significantly less network bandwidth than retransmitting all of the underlying data, as done conventionally.

As indicated above, the same to-be-confirmed data may additionally, be repeatedly hashed and verified over time, with each repetition including a change in one or more of characteristic of the hashing process, such as but not limited to: the hash function used, the hash seed used, or the starting and/or endpoint of the data hashed within the to-be confirmed data. Each subsequent pass of such data confirmation processes, resulting in a positive comparison of the hash values increases the confidence that the underlying data is, in fact, identical. The more passes completed and resulting in a positive match of hash values, the more likely the underlying data is, in fact, the same.

More specifically, in some additional embodiments of the present disclosure, the data confirmation process may be repeated for any data or set of data with a different hash function. Likewise, in embodiments where a hash seed is utilized, the data confirmation process for any data or set of data may be repeated with a different hash function and/or a different hash seed. As will be appreciated, repeating the data confirmation process utilizing a different hash function and/or a different hash seed will typically result in different hash values for the same original data as compared to those generated in a previously performed confirmation process. Because it is very unlikely that unequal data (e.g., original Data 1 302 and replicated data 308 in FIG. 3) being compared between two sites would hash to equivalent hash values in both a first data confirmation process, utilizing a first hash function and optionally a hash seed, and a second data confirmation process, utilizing a different hash function and/or hash seed, it is very unlikely that a collision would go undetected. Accordingly, where repeated data confirmation processes result equal hash values between the data sites, the confidence that the underlying data at those data sites is also the same is increased significantly. In this way, a repeated confirmation process can act as a sort of double-check to confirm the results of any previous confirmation process.

Figure 4:
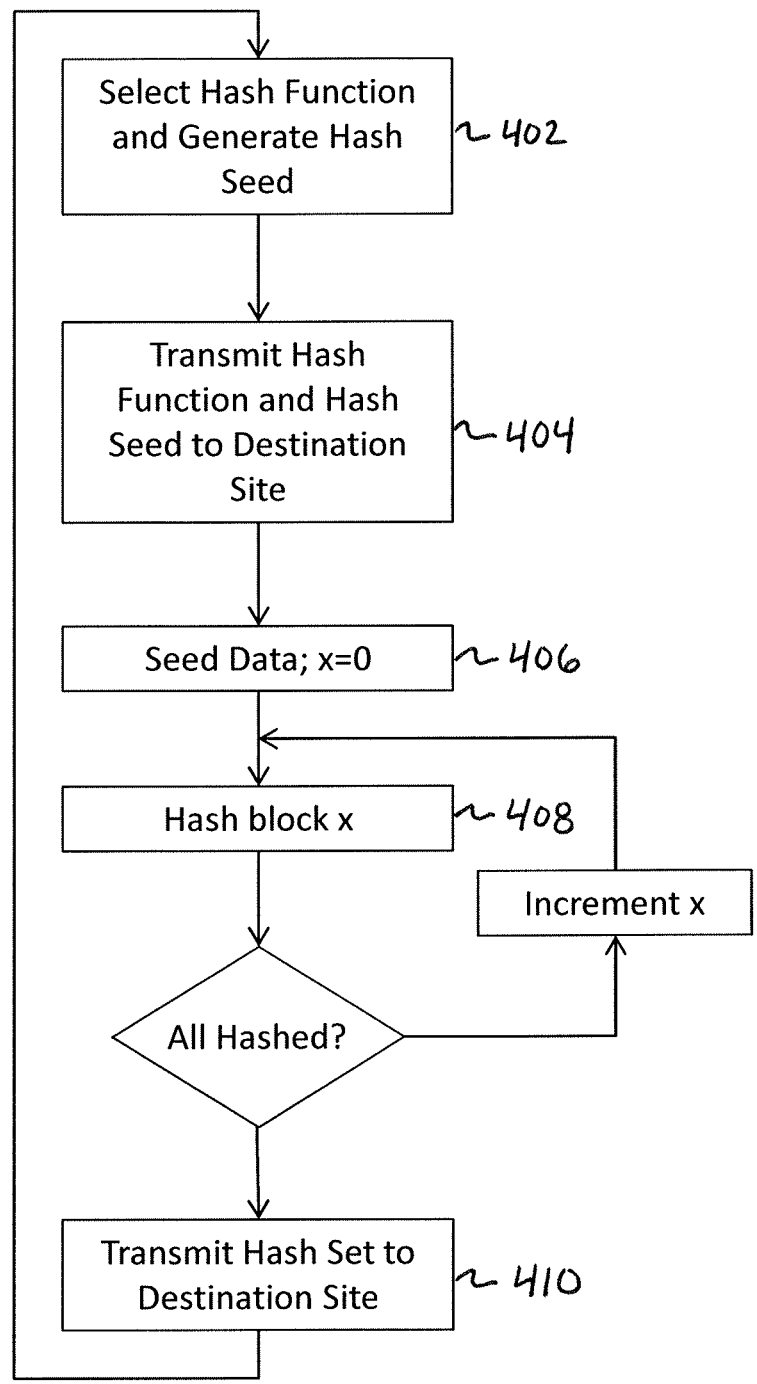
FIG. 4 is a flow diagram of a method for confirming data consistency in a data storage environment in accordance with one embodiment of the present disclosure.

With reference to FIG. 4, an example method of repeated data confirmation is illustrated in a flow diagram. While illustrated with respect to actions performed at an originating or source site, it is recognized that similar steps may be performed at the destination site. Additionally, while the example method of FIG. 4 is discussed with respect to certain steps, it is recognized that not every embodiment will include each step illustrated in FIG. 4, that some embodiments may include additional steps, and that in other embodiments, the steps may be performed in another order. In step 402 of the example method of FIG. 4, a hash function may be selected or provided. As discussed above, in some cases, there may only be a single hash function available, while in other cases, several available hash functions may be selected from. In addition, in step 402, if a hash seed is optionally used, a hash seed may be selected, provided, or otherwise generated. In step 404, the hash function and any optional hash seed may be transmitted to the destination site, so that it is ensured that the destination site has available the same hash function and hash seed. Of course, as discussed above, any other suitable method of ensuring that both sites utilize the same hash function and/or hash seed may be utilized, and transmitting the hash function and/or hash seed from the source site to the destination site is but one example. In step 406, if a hash seed is optionally being utilized, the data or data set may be added, combined, or otherwise associated with the hash seed to alter the data or data set in a predetermined manner, as discussed above. In step 408, a first block of the data or data set, as optionally modified by a hash seed, may be hashed using the selected or provided hash function. If the data or data set comprises more than one block, as illustrated in FIG. 4, each block is hashed in a similar manner to that of the first block. Either as the data is hashed, or generally immediately or shortly thereafter, in step 410, the hash values or set of hash values may be transmitted to the destination site for comparison to the hash values computed thereat, as described above. Some period of time later, whether based on a periodic schedule, random schedule, administrator's instruction, or other method, the process may be repeated on the same data or data set, initiating again at step 402 with a hash function being selected or provided and an optional hash seed being selected, provided, or otherwise generated. Typically, either or both the hash function or hash seed are changed to increase the confidence of the data confirmation process with each pass.

The process can be performed or repeated in this manner, with varying hash functions and/or, if a hash seed is used, varying hash seeds, any suitable or desired number of times. In some embodiments, the more times the process is repeated with varying hash functions and/or hash seeds, the more the confidence that the underlying data is valid at each data site is increased. Indeed, the data confirmation process may be repeated as many times as may be desired so as to obtain a specified or required confidence level, which may vary depending partly on the type of data stored and the significance or importance thereof. Because transmitting the hash function, computed hash values, and optionally a hash seed between the data sites generally consumes such a significantly less amount of network bandwidth than in conventional methods, the data confirmation process could be repeated several times over a given period of time without significantly compromising the available bandwidth.

Figure 5A:
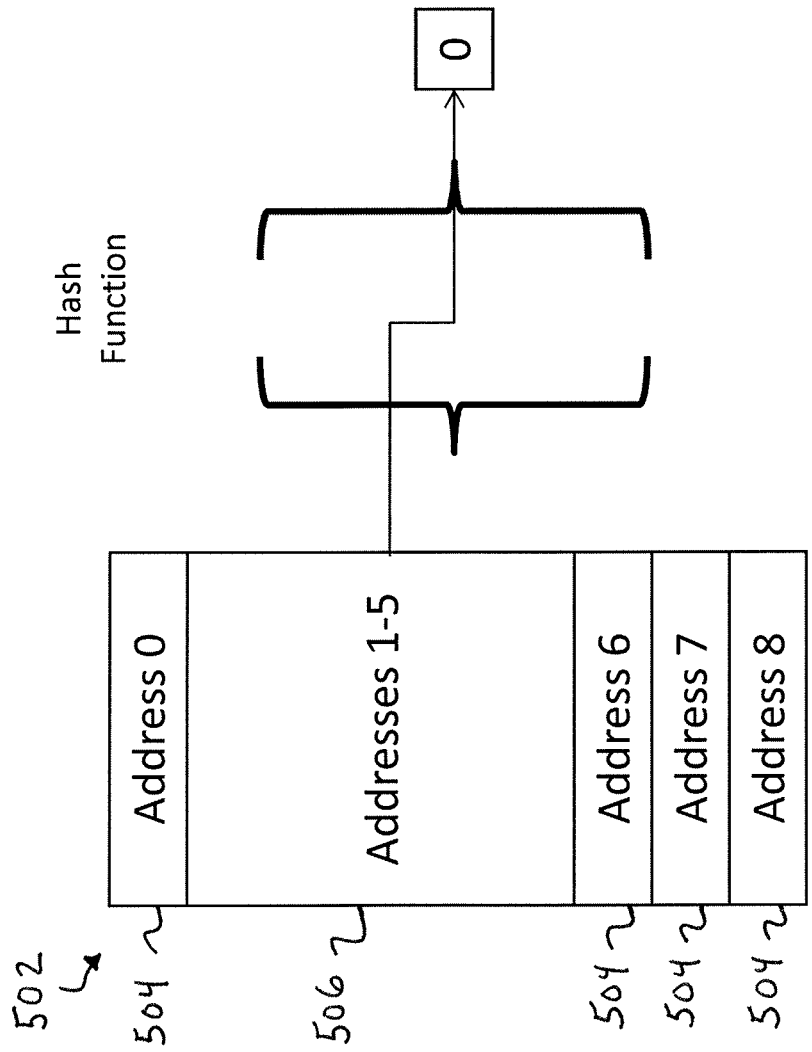
FIG. 5A is a concept drawing of a method for confirming data consistency in a data storage environment in accordance with another embodiment of the present disclosure.
Figure 5B:
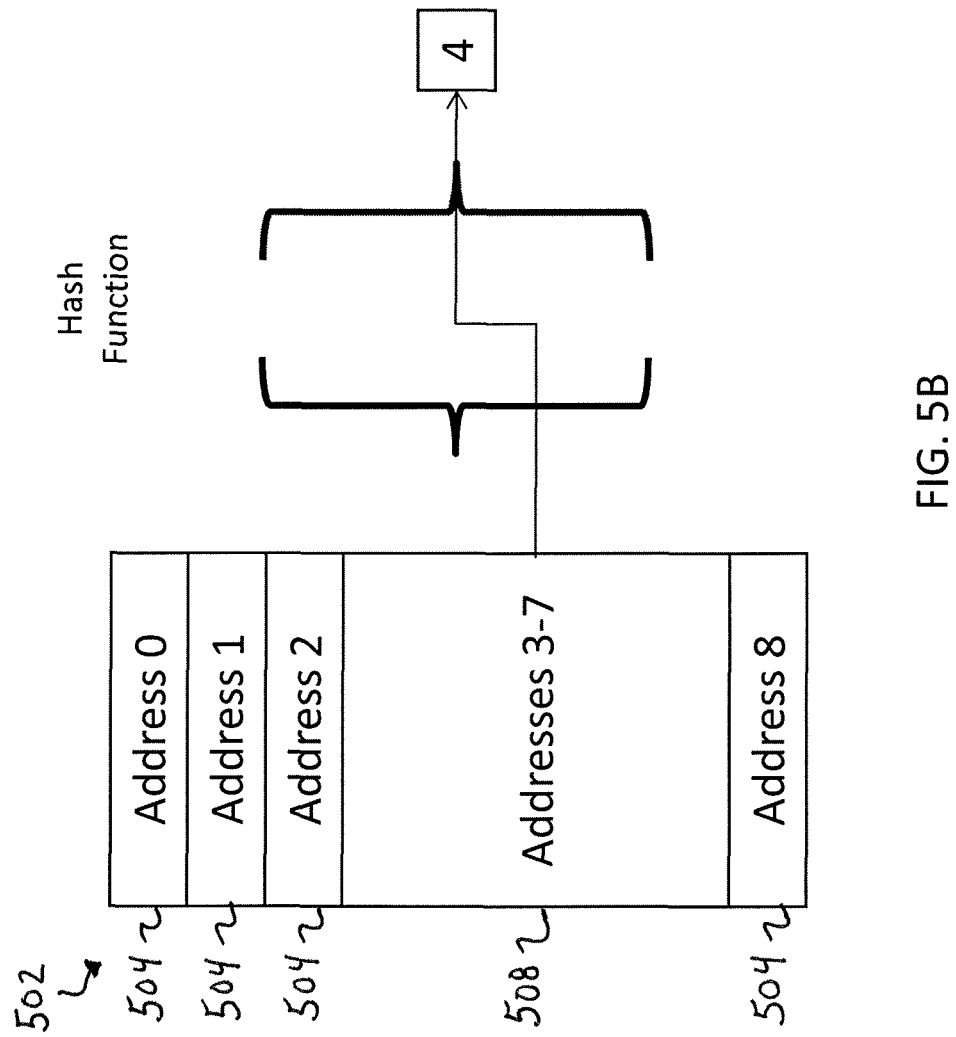
FIG. 5B is a concept drawing of a data confirmation process performed subsequent the method for confirming data consistency in a data storage environment of FIG. 4A.

FIGS. 5A and 5B help illustrate another embodiment for confirming data consistency as an alternative to or in addition to utilizing a hash seed as described above. As illustrated in FIG. 5A, for any given data 502 having a plurality of addressable units 504 at a first data site, instead of hashing all the data, a subset 506 (e.g., Addresses 1-5 in FIG. 5A) of addressable units may be selected for hashing in accordance with the various embodiments described above, and the resulting hash value may be compared with a hash value computed for replicated data at a second data site corresponding to the addressable units in the selected subset 506. In some embodiments, the result of the comparison of the hash values computed for the data corresponding to subset 506 may be representative of the validity of all the data 502.

In a subsequent or repeated data confirmation process, as illustrated in FIG. 5B, a different subset 508 (e.g., Addresses 3-7) of addressable units from the data 502 may be hashed and compared with a hash value computed for replicated data at the second data site corresponding to the addressable units in the newly selected subset 508. Again, the result of the comparison of the hash values computed for the data corresponding to subset 508 may be representative of the validity of all the data 502. However, because the addressable units selected for the subsets 506 and 508 differ, if both the first and subsequent confirmation processes result in matching hash values, then the confidence that all the data 502 is valid at both sites increases. Any suitable number of additional data confirming processes may be run in a similar manner, with each process selecting a different subset of data from the previous process.

Performing a plurality of confirmation processes utilizing various subsets 506, 508 of data 502, as described above, increases the reliability of the data confirmation results for all the data 502 and reduces the probability of a collision resulting in an undetected error. The reliability is increased because if there is any invalid portion of data 502 at one of the sites, it is very likely that at least one of the selected subsets would result in a mismatch of hash values, thereby indicating an error in the data at one of the sites. In some embodiments, the more times the process is repeated with varying subsets of data, the more the confidence that the underlying data is valid at each data site is increased.

Although illustrated as subsets comprised of contiguous addressable units, subsets 506, 508 need not be comprised of contiguous addressable units, but could be any organized subset of data. Similarly, although shown with eight addressable units in FIGS. 5A and 5B, subsets 506, 508 could include fewer or greater addressable units. Likewise, the number of addressable units included in a subset and hashed during any given data confirmation process need not be the same as any previous confirmation process. That is, for any given data confirmation process, a subset could include any suitable number of addressable units without regard to how many addressable units are used in any previous or subsequent data confirmation process. Additionally, any particular addressing method for addressing the addressable units may be utilized. Furthermore, in some embodiments, the subsets need not be defined by traditional addressable units, but rather could be defined by any method, such as but not limited to, simply defining a starting and ending point within in the data 502.

Any of the various embodiments for data confirmation of the present disclosure may be run at any time, and any of the various embodiments for data confirmation of the present disclosure may be triggered by any suitable method, such as but not limited to, triggered manually by an administrator, triggered automatically by the data storage subsystem or a controller or other processing device located at one of the data sites, triggered automatically based on a triggering event, or triggered randomly. A triggering event could be any type of event, including but not limited to, a particular date and/or time, when a particular level of network bandwidth is available, a transition from peak time to non-peak time, or vice versa, based on, for example, historical data or standardized data relating to peak times, or any combination of events, etc. In other embodiments, any of the methods for data confirmation of the present disclosure may be run generally continuously or semi-continuously, for example, as a background process of the data storage subsystem. In some embodiments, as used herein, the terms continuously and semi-continuously may be defined by the typical understanding of those terms as used in the art or defined by well-known dictionaries. For example, the term continuously may be defined as an uninterrupted extension in space, time, or sequence, and the term semi-continuously may be defined as a substantially uninterrupted extension in space, time, or sequence. In other embodiments, the term continuously may refer to embodiments of the present disclosure that are configured to run one or more data confirmation processes, simultaneously, sequentially, or both, over an extended period of time, such as for more than two consecutive hours, and are generally given the ability to consume resources without interruption for substantially the entire period of time. Similarly, in other embodiments, the term semi-continuously may refer to embodiments of the present disclosure that are configured to run one or more data confirmation processes, at least periodically, over an extended period of time, such as for more than two consecutive hours, and are generally given the ability to consume resources for at least more than half the time. Additionally, any of the various embodiments for data confirmation of the present disclosure may be configured so as to run more heavily during periods of relatively increased system activity and less heavily during periods of relatively decreased system activity, so as not to significantly impact or interfere with normal or regular system performance or utilize significant amounts of network bandwidth that could otherwise be used for other system activity. Further, while any of the various embodiments for data confirmation of the present disclosure may be run generally continuously or semi-continuously, it is recognized that the data confirmation processes need not run at a consistent level for the entire period of time they are running continuously or semi-continuously and, indeed, could be periodically halted and restarted at various times for any desired or suitable reason, such as but not limited to, by administer request or based on system demand. In still further embodiments, any of the various embodiments for data confirmation may be run based on a predefined periodic schedule, such as but not limited to, at a specified time each day or week.

In some embodiments, one or more data reports may be generated from time to time identifying the results of any data confirmation processes run over a specified period of time. Such reports could include a statistical analysis of the validity of data between two or more data sites. In one particular embodiment, for example, a data report could provide a value indicative of the confidence that all, or a specified portion of, data at each data site is valid. The report(s) could be used to analyze whether the data confirmation processes should be modified to increase, or even decrease, if desired, the confidence level, such as by modifying how often the data confirmation processes run, when and for how long the data confirmation processes run, which data the data confirmation processes run on, the hash function or hash seed used, etc. In further embodiments, the data storage system may automatically generate reports and utilize the data obtained from the report to automatically adjust the data confirmation processes in order to achieve a predefined or otherwise specified confidence level.

The various embodiments of the present disclosure relating to systems and methods for confirming data consistency in a data storage environment provide significant advantages over conventional systems and methods for systems and methods for confirming data consistency in a data storage environment, which generally involve resending entire chunks of the underlying data between data sites for comparison. For example, the various embodiments of the present disclosure may consume significantly less network bandwidth in order to confirm the validity of data between data sites, thus saving available bandwidth for other relatively more important, or even less important, system activity, such as but not limited to, initial replication of the data. Although certainly not limited to such systems, the various embodiments of the present disclosure may be particularly useful in systems with relatively slower network links or connections or in systems where there is a significant amount of other communication which should have priority to the available bandwidth.

In addition, repeated hash processes over periods of time, with each repetition including a change in one or more of characteristic of the hashing process, as described herein can increase the confidence that the underlying data is, in fact, identical. The more passes completed and resulting in a positive match of hash values, the more likely the underlying data is, in fact, the same.

Additionally, in many cases, the owner of the data site where the original data is stored and the owner(s) of any data sites where replicated data is sent and stored are not the same. Without direct access to the data stores and supporting hardware and software at the replication sites, the owner of the original data site may, at best, only be able to rely on information provided by the owner(s) of the other data sites regarding the validity of data stored thereat. The owner of the original data site, however, may like to have a method for confirming, through its own system, the reliability of the data stored at the replication sites. Preferably, the owner may like to do so without significant impact on its system's performance. The various embodiments of the present disclosure can fill this need.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

I claim:

1. A method for confirming validity of replicated data at a data storage site, the method comprising:
    a) replicating first data from a first computer readable storage medium at a first data storage site as second data to a second computer readable storage medium at a second data storage site;
    b) transmitting a hash function, executable by a computer processor, and a hash seed via a computer network from at least one of the first or second data storage sites to the other of the first or second data storage sites so that the hash function and hash seed are available for use by both first and second data storage sites;
    c) modifying the first data stored on the first computer readable storage medium at the first data storage site based on the hash seed, and utilizing the hash function, computing a first hash value based on the seed-modified first data, the first hash value being smaller in size than the first data;
    d) modifying the second data stored on the second computer readable storage medium at the second data storage site based on the hash seed, and utilizing the hash function, computing a second hash value based on the seed-modified second data, the second hash value being smaller in size than the second data;
    e) transmitting at least one of the first or second hash values via a computer network for comparing with the other of the first or second hash values, instead of transmitting the larger sized first or second data via the computer network; and
    f) comparing the first and second hash values, in lieu of comparing the actual first and second data, to determine whether the second data is a valid replication of the first data, wherein a mismatch between the first and second hash values indicates that at least one of the first or second data storage sites includes invalid data.

2. The method of claim 1, wherein the first and second data storage sites are remotely connected by the computer network.

3. The method of claim 1, further comprising providing a data structure storing a plurality of hash functions executable by a computer processor, each being available for use by the first and second data storage sites.

4. The method of claim 3, further comprising selecting the hash function from the data structure storing a plurality of hash functions for utilization in computing the first and second hash values.

5. The method of claim 1, further comprising:
    utilizing a second hash function executable by a computer processor, computing a third hash value based on the first data stored on the first computer readable storage medium at the first data storage site;
    utilizing the second hash function, computing a fourth hash value based on the second data stored on the second computer readable storage medium at the second data storage site;
    transmitting at least one of the third or fourth hash values via a computer network for comparing with the other of the third or fourth hash values; and
    comparing the third and fourth hash values, in lieu of comparing the actual first and second data, to determine whether the second data is a valid replication of the first data.

6. The method of claim 1, further comprising:
    modifying the first and second data based on a second hash seed;
    utilizing the hash function, computing a third hash value based on the second hash seed-modified first data;
    utilizing the hash function, computing a fourth hash value based on the second hash seed-modified second data; and
    comparing the third and fourth hash values to determine whether the second data is a valid replication of the first data.

7. The method of claim 1, further comprising repeating steps through b) through e) a plurality of times, each time utilizing a different hash function than in a previous time.

8. The method of claim 7, wherein the steps b) through e) are repeated according to a predetermined periodic cycle.

9. An information handling system comprising:
    a first data storage site comprising a computer readable storage medium storing first data, and a computer processor computing a first hash value based on the first data and a hash seed, utilizing a hash function; and
    a second data storage site comprising a computer readable storage medium storing data replicated from the first data storage site and a computer processor computing a second hash value based on second data and a hash seed, utilizing the same hash function;
    wherein at least one of the first data storage site and second data storage site is configured to transmit the hash function and hash seed via a computer network to the other of the first data storage site or second data storage site so that the hash function and hash seed are available for use by both first and second data storage sites; and
    wherein at least one of the first data storage site and second data storage site is configured to transmit its computed hash value via the computer network to the other of the first data storage site and second data storage site for comparison of the first hash value with the second hash value, in lieu of comparing the actual first and second data, to determine whether the second data is a valid replication of the first data, wherein a mismatch between the first and second hash values indicates that at least one of the first or second data storage sites includes invalid data.

10. The information handling system of claim 9, wherein the first data storage site and the second data storage site are remotely connected via the computer network.

11. A method for confirming validity of replicated data at a data storage site, the method comprising:
   a) replicating first data from a first computer readable storage medium at a first data storage site as second data to a second computer readable storage medium at a second data storage site;
   b) transmitting a hash function, executable by a computer processor, and a hash seed via a computer network from at least one of the first or second data storage sites to the other of the first or second data storage sites so that the hash function and hash seed are available for use by both first and second data storage sites;
   c) modifying a selected portion of the first data stored on the first computer readable storage medium at the first data storage site based on the hash seed, and utilizing the hash function, computing a first hash value based on the seed-modified selected portion of the first data;
   d) modifying a selected portion of the second data stored on the second computer readable storage medium at the second data storage site based on the hash seed, and utilizing the hash function, computing a second hash value based on the seed-modified selected portion of the second data, the selected portion of the second data corresponding to the selected portion of the first data;
   e) transmitting at least one of the first or second hash values via a computer network for comparing with the other of the first or second hash values, instead of transmitting the larger sized first or second data via the computer network;
   f) comparing the first and second hash values, in lieu of comparing the actual first and second data, to determine whether the selected portion of second data is a valid replication of the selected portion of first data; and
   f) repeating steps c) through f) a plurality of times, each time utilizing a different selected portion of the first data and corresponding selected portion of the second data than in a previous time, wherein a mismatch between the first and second hash values indicates that at least one of the first or second data storage sites includes invalid data.

12. The method of claim 11, wherein the first and second data storage sites are remotely connected by the network.

13. The method of claim 11, wherein the steps c) through f) are repeated according to a predetermined periodic cycle, each subsequent repetition in a contiguous chain of repetitions resulting in a match of the first and second hash values increasing the likelihood that the second data is a valid replication of the first data.

* * * * *